Jan. 26, 1954 P. G. CRISAFULLI 2,667,254

WEIGHT ACTUATED MECHANISM

Filed April 12, 1949 5 Sheets-Sheet 1

Peter G. Crisafulli Inventor

By Peter J. Gaylor Attorney

Jan. 26, 1954 P. G. CRISAFULLI 2,667,254

WEIGHT ACTUATED MECHANISM

Filed April 12, 1949 5 Sheets-Sheet 2

Peter G. Crisafulli Inventor

By Peter J. Gaylor Attorney

Jan. 26, 1954 P. G. CRISAFULLI 2,667,254

WEIGHT ACTUATED MECHANISM

Filed April 12, 1949 5 Sheets-Sheet 3

Peter G. Crisafulli Inventor

By Peter J. Gaylor Attorney

Jan. 26, 1954 | P. G. CRISAFULLI | 2,667,254

WEIGHT ACTUATED MECHANISM

Filed April 12, 1949

5 Sheets-Sheet 4

Peter G. Crisafulli Inventor

By Peter J. Gaylor Attorney

Jan. 26, 1954 P. G. CRISAFULLI 2,667,254

WEIGHT ACTUATED MECHANISM

Filed April 12, 1949 5 Sheets-Sheet 5

Peter G. Crisafulli Inventor

By Peter J. Gaylor Attorney

Patented Jan. 26, 1954 2,667,254

UNITED STATES PATENT OFFICE 2,667,254

WEIGHT ACTUATED MECHANISM

Peter G. Crisafulli, Newark, N. J.

Application April 12, 1949, Serial No. 87,019

5 Claims. (Cl. 194—9)

This invention deals with a weight actuated mechanism and with machines incorporating such mechanism. The present application is a continuation-in-part of copending application Serial No. 25,375, filed on May 6, 1948, by Peter G. Crisafulli, now Patent No. 2,620,914, December 9, 1952, and discloses and claims various improvements, such as a new sliding gate, new means for discharging weights thereby, new structural features in the lever arm, and other novel improvements which will be described herein.

In the earlier filed application, a device was disclosed incorporating a series of superimposed lever arms mounted vertically in a channel member, and a gate was provided to slide in front of said channel and in vertical relation thereto. In this latter assembly, the gate movement upwardly discharged the weights into the gate through slots in the back of said gate, whereas gate movement in a downward direction caused the gate to separate from the channel (by means of inclined planes provided on the front side edges of the channel), so that the weights held by the lever arms discharged through the space between the gate and the arms, created by the separation of the gate.

It has been found that this separation movement of the gate possessed certain disadvantages. For example, in small dispensing machines which could be misused by sharp blows or lateral movements, some displacement of the gate could be effected so as to cause some coins to be returned to the customer while the material purchased was being dispensed. However, many of the features of the present invention involve elements of greater simplicity in design and construction and greater durability in comparison with the devices described in the earlier filed application.

In the present invention, the gate moves only in a vertical direction and does not separate from the channel member, and the discharge of the weights takes place through the slots in the back of the channel wall, the disposition of the discharged weights being determined by the positioning of the weight deflecting baffle at the bottom of the back of the gate, depending on whether the gate is raised or lowered.

Figure 7:
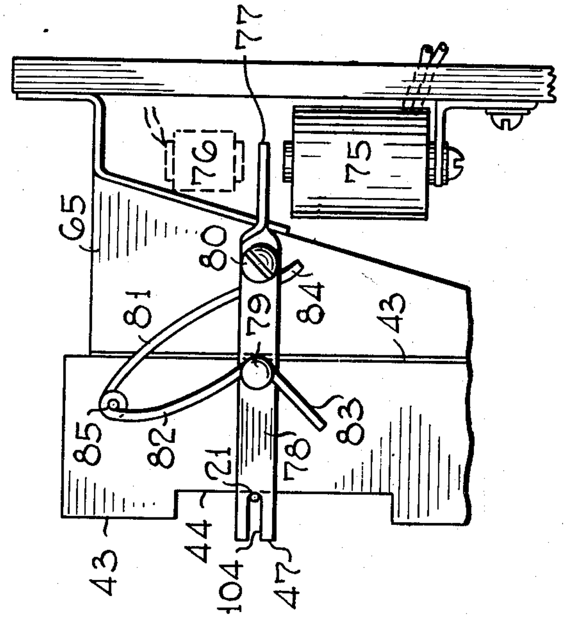
Figure 2:
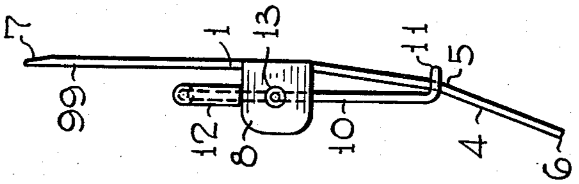
Figure 1:
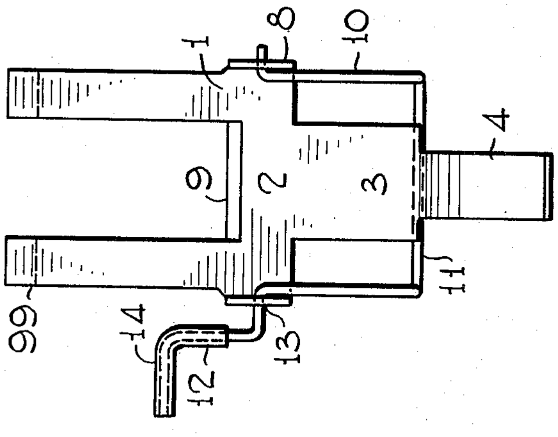
Figure 12:
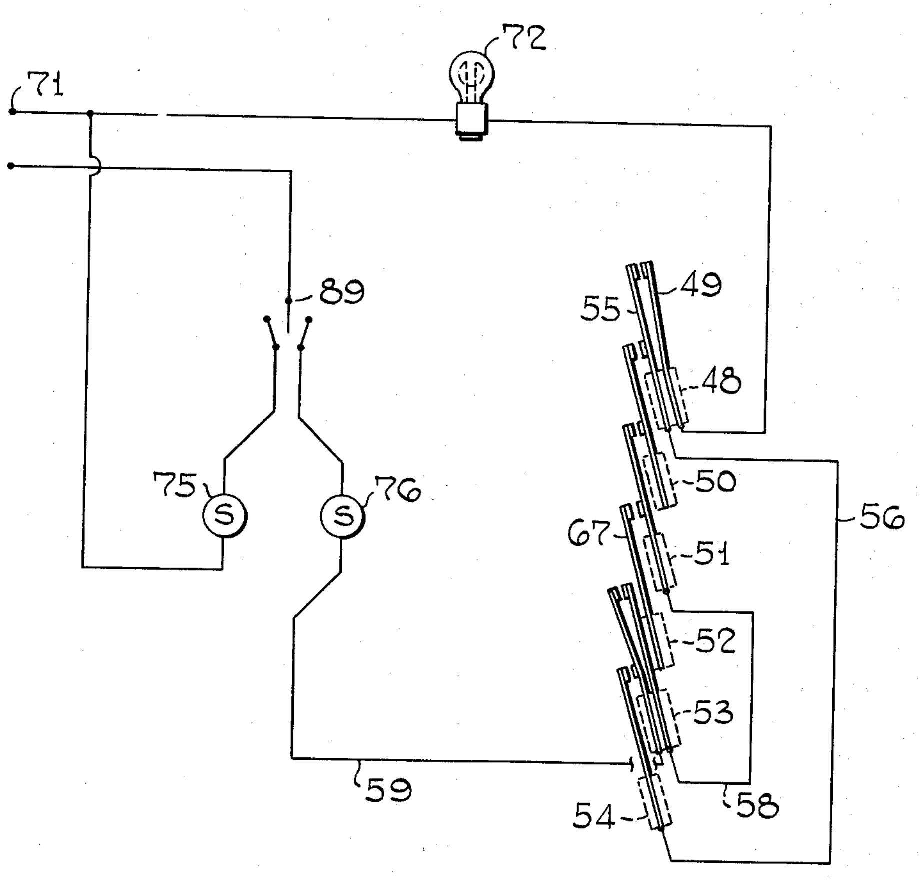
Figure 11:
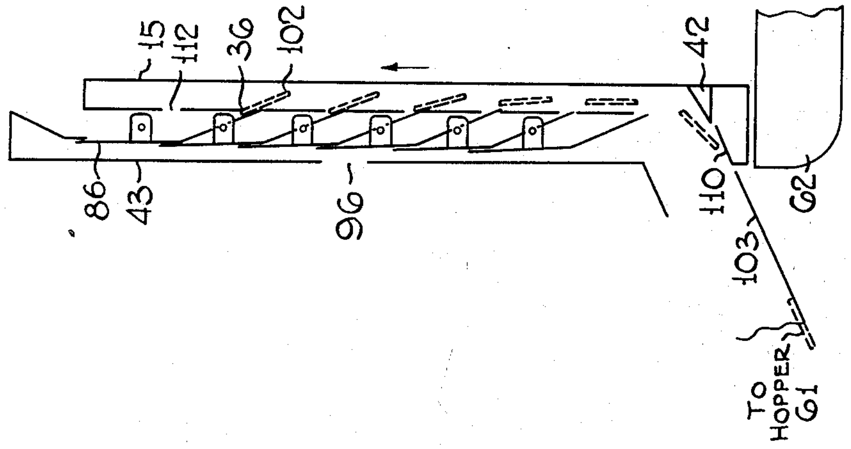
Figure 10:
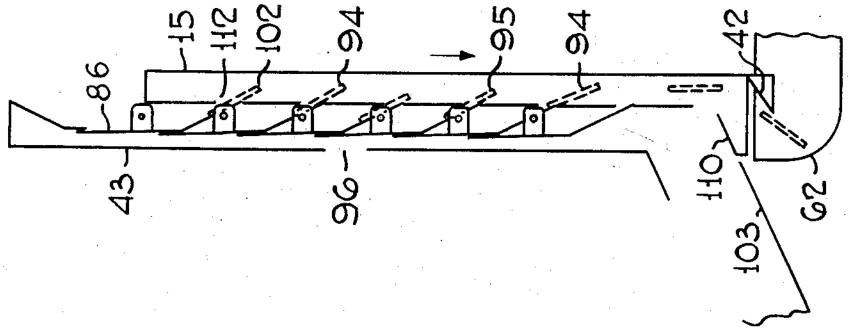
Figure 9:
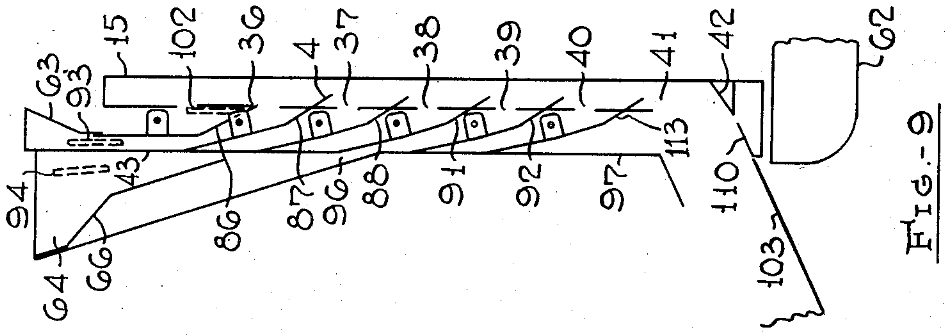
Figure 5:
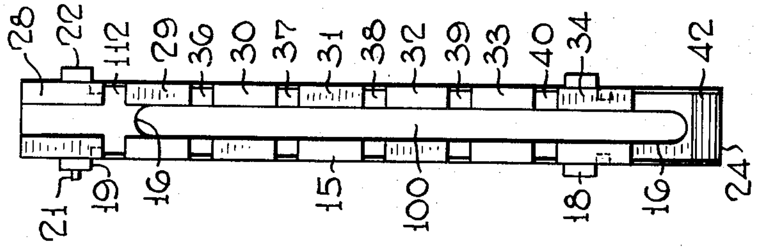
Figure 4:
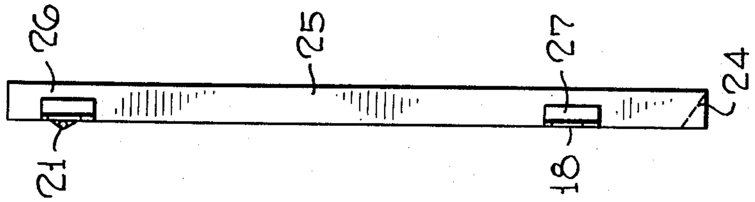
Figure 3:
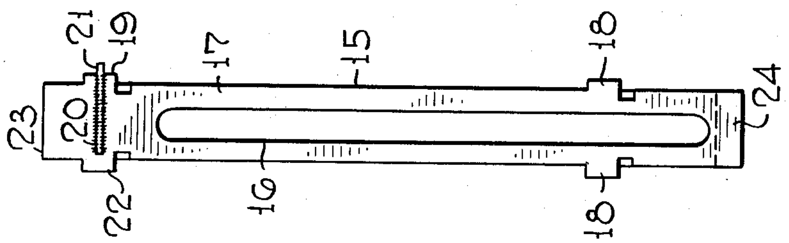
Figure 6:
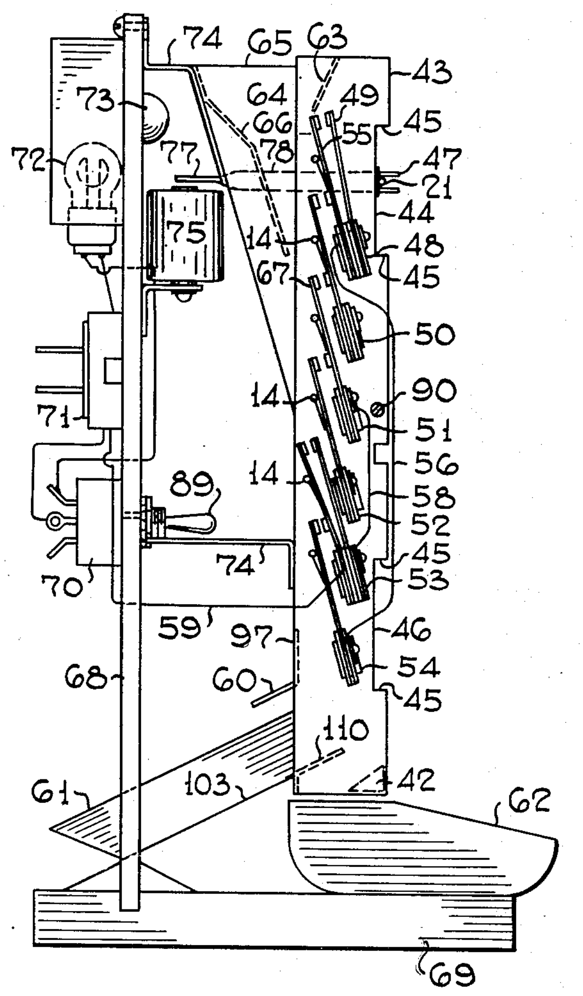
Figure 8:
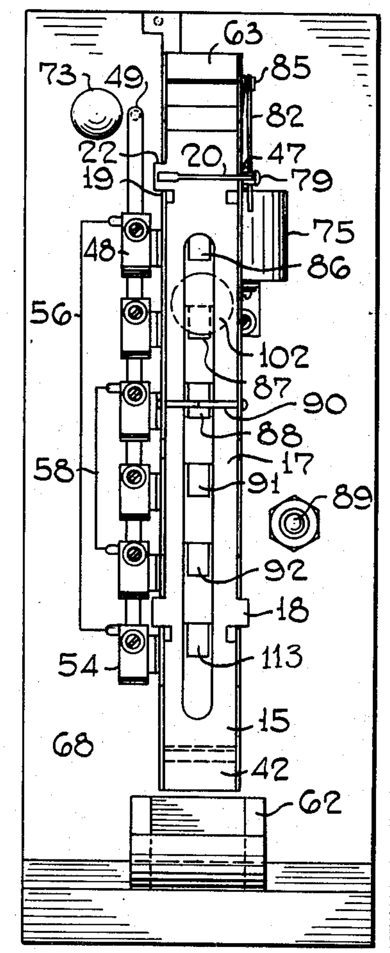

The invention will be more readily understood by reference to the drawings in which Figure 1 represents a front view of the improved lever arm, while Figure 2 shows a side view thereof. A front view of the gate is shown in Figure 3, the side view thereof in Figure 4 and the back view in Figure 5. A side view of an assembled actuating unit, for installation in a dispensing machine, is illustrated in Figure 6, while Figure 8 shows a front view of the same unit. A cutaway side view of the upper portion of the unit disclosed in Figures 6 and 8 is illustrated in Figure 7. Schematic side views of the unit in Figs. 6 and 8, showing the gate in idle, coin collecting, and coin return positions, respectively, are depicted in Figs. 9, 10 and 11, while Fig. 12 is a circuit diagram of the respective contacts and switch shown on the unit in Fig. 6. Similar numbers refer to similar parts in the various figures.

Referring again to the drawings, numeral 1 represents a lever arm having a pronged upper portion consisting of two prongs 99, the upper edges 7 of which are bevelled on the backs thereof, while the edge 9 between the two prongs is bevelled on the front (for facilitating travel of weights thereover). The lower section of lever arm 1 consists of centrally disposed arm section 3 of a width about the same as that of the space between prongs 99, said section 3 being bent forwardly about 5°, more or less, with respect to prongs 99. Attached to the lower portion of section 3 is centrally disposed arm 4 which is also bent forwardly about 15°, more or less, with respect to section 3.

It has been found that the new structure of the lower portion of the arm 1 results in better retention of weights under conditions of severe misuse than the design shown in the earlier filed application. As in the case of the earlier application, wire member 10, employed for actuating the electrical contacts 55, etc. or other external apparatus, is attached to lugs 8 projecting forwardly from the sides of the middle section 2 of the lever arm. Hole 13 in one of the lugs 8 allows holding of the free end of wire 10 which is then bent in the form of a U passing behind the lever arm at a point preferably between sections 3 and 4, with the other end of the U passing through hole 13 in another lug. The wire is then bent upwardly and horizontally to form actuating arm 14 for exerting pressure on switch contact 55 or other extraneous actuating device, when lever arm 1 (or its equivalent arm 86) is loaded. Wire arm 14 is preferably coated with insulating sleeve 12.

As in the case of the earlier filed application, gate 15 (which slides vertically in channel 43 and has top 23 and bottom 24) is mounted in the open portion of channel 43. Front face 17 of gate 15 is provided with a long, vertical, centrally disposed slot 16, narrower than the weights 102, etc. used for actuation of the lever arms, and is employed for observation within said gate and channel. The back wall of gate 15 (Fig. 5) is provided with a series of narrow lips 28, 29, 30, 31, 32, 33 and 34 projecting inwardly from side 25, and another series of narrow lips projecting from the other side and oppositely disposed, with an opening 100 between the two series of lips, said opening being narrower than the width of the weights 102, etc. employed for actuating lever arms 1. Between the lips, in the vertical direction, are cut-out portions 112, 36, 37, 38, 39 and 40 through which the weights pass when gate 15 is raised or lowered. At the bottom back portion of the front face 17 is baffle 42 for deflecting weights 102, etc. which fall into gate 15.

Front face 17 of gate 15 is also provided with side extensions 18, 19 and 22 which act as limiting means for holding gate 15 a fixed distance within channel 43, and also act as bearing surfaces sliding on side edges 44 and 46 of channel 43 (Fig. 6) as gate 15 is moved up or down. Screw 90, which is inserted through holes in the edges of the sides of channel 43 and disposed immediately in front of face 17 of gate 15, serves to keep gate 15 tightly against channel 43. Stops 45 on the sides of channel 43 serve to limit the travel of bearing surfaces 18, 19 and 22 and consequently limit the vertical travel of gate 15.

As shown in Fig. 12, which depicts the circuit diagram for the lever arm contacts and switch of the unit illustrated in Figs. 6 and 8, when nickels are employed in the machine, the first coin entering chute 63 causes lever arm 86 to raise contact 55 against contact 49. The second nickel raises the contact based at 50 against the lower contact on 55. The third nickel raises the contact based at 51 against the lower contact based on 50, while the fourth nickel raises contact 67 against the lower contact based on 51. For a 25¢ purchase, contact 67 is not required for operating the electrical circuit, and the lever arm therefore merely holds the fourth nickel to make possible the reception of the fifth nickel on the lever arm below which completes the electrical circuit. The last nickel closes the two contacts based on 53, whereupon the circuit is complete through dispensing switch 89, the current flowing from switch 89, line 59, through the contacts based on 53, through line 58, contacts based on 51 and 50, thence through contacts 55, 49 and back to switch 89. When two dimes and a nickel are employed, the first dime entering chute 65 raises the lowest contact member based on 53 against the upper contact member. The second dime raises the contact based on 54 against the lower contact on the lower member based on 53. The nickel entering chute 63 raises contact 55 against 49, thus completing the circuit, causing the current to flow from switch 89 through line 59, then through the lower contact on base 53, then through the contact on base 54, line 56, contacts 55 and 49 and back to switch 89. When one dime and three nickels are employed, the dime closes the two contacts mounted on base 53. The first nickel closes contacts 49 and 55, the second raises the contact on base 50 against contact 55, while the third nickel closes the contacts on bases 51 and 50, thus completing the circuit. Current then flows through switch 89, line 59, contacts on base 53, line 58, contacts on bases 51 and 50, contacts 55, 49 and back to switch 89. Naturally, when the required circuit is completed via the lever-actuated contacts, for dispensing the goods purchased, solenoid 76, which is connected in series in the circuit, will be actuated when switch 89 is thrown in dispensing position.

As is customary in the dispensing field, the coin return circuit for actuating solenoid 75 is a separate circuit and solenoid 75 can be energized at any time by throwing switch 89 to coin return position.

The unit depicted in Figures 6, 8, 9, 10 and 11 is designed for actuation by two types of weights or coins. Chute 63 is designed to be employed for nickels (in this particular case) and the coins dropped therein can actuate lever arms 86, 87, 88, 91, 92, and 113, although, for a 25¢ purchase, not more than five of the upper lever arms need be actuated by nickels, while chute 64 is designed to be employed for dimes, and the coins dropped therein may actuate the last two (bottom) lever arms 92 and 113, these coins entering channel 43 through opening 96.

When this unit is set for a purchase price of 25¢, it will operate on five nickels or a combination of nickels and dimes, and chute 63 will accommodate five nickels when dimes are not inserted in chute 64. An additional nickel will actuate arm 113, but will be in excess of payment needed to dispense the article purchased. Of course, it is possible to remove any number of lever arms, depending on the purchase price set for the merchandise. Also, a unit may be made having only one lever arm, to actuate a subway gate, for example, or any number of lever arms and chutes, as desired and as discussed in more detail in the earlier filed application.

The operation of the unit may be more readily understood by reference to the diagrammatic side views shown in Figures 9–11. Figure 9 illustrates the machine with all lever arms, except the first one (86) in the idle or unactuated positions. It will be observed that when lever arms 86, 87, etc. rest in the idle position, their top portions fall back, due to top-heaviness obtained by balancing at fulcrums 13, and thus, when in idle position, the upper prongs 99 rest against the back wall of the channel 43 with bevelled edge 7 flush against the surface of the back wall. It will also be observed that when the machine is in idle condition with no coins inserted, the bottom sections 4 of the lever arms project through opening 100 (Fig. 5) in the back of gate 15 and approximately half way between slots 112 and 36, 36 and 37, etc., so that lips 29, 30, 31, etc. are in position to retain the coins as in the case of coin 102 in Figure 9. As coin 102 slides over lever arm 86, the weight of the coin causes prongs 99 (Fig. 2) to tilt forwardly with bevelled ends 7 of the prongs resting in a vertical position and, in the case of lever arm 86, the prongs would be flush with the vertical bottom portion of chute 63. In the case of the lower coin actuated lever arms, their upper prongs would be flush against the backs of the immediately higher lever arms.

When lever arm 86 is tilted by coin 102, a passageway is created in the channel behind lever arm 86, allowing another coin, such as 93, fed into chute 63, to fall clear of lever arm 86 and onto the upper prongs of the next lower lever arm 87, which is then tilted in a similar manner, until all of the lever arms are filled with coins. Any additional coins fed into the chutes after this takes place drop all the way down channel 43 and are deflected by baffle 110 punched out of the back of channel 43, thence to chute 103 and into coin return hopper 61.

As the lever arms are tilted by the coins, wire arms 14 are forced upwardly against lower electrical contacts 55, 67, etc. (Figure 6), which then make contact with upper contacts 49, etc., and when the predetermined or required number of coins are present, all contacts and switches necessary for completing the various circuits (shown in the diagram in Figure 12) are closed and bulb 72 becomes lighted which provides a colored signal 73 notifying the customer that the machine is dispensing the article purchased. (Such light, of course, need not be mounted in the vending machine.) When switch 89 is actuated to dispensing position, gate 15 is caused to be lowered as in Fig. 10 (in a manner to be explained later), thereby bringing into juxtaposition with coins 102, etc. slots 112, 36, etc. which causes coins 102, etc. to fall within gate 15 and down against baffle 42 on the back of the front face 17 of the gate, which baffle deflects the coins into collecting bin 62. Opening of switch 89 will cause gate 15 to return to idle position because of the action of spring 82, as will be outlined later.

If, for some reason (such as an empty dispensing machine, changing of mind by the customer, etc.) it is desired to have the coins on the lever arms returned to the customer, switch 89 is flipped to coin-return position and this actuates solenoid 75 (Fig. 6) which raises gate 15 as in Fig. 11 (in a manner to be outlined later). This action brings slots 36, 37, etc. in juxtaposition with coins 102, etc. which causes the coins to drop through the slots in the back of gate 15 and onto baffle 42, but due to the fact that baffle 42 has been raised above the level of baffle 110, the coins drop on baffle 110, and thence to chute 103 and into coin return hopper 61.

Now, as to the manner of moving gate 15 vertically, Figure 7 may be employed for reference. It will be observed from Figures 3 and 8 that the upper portion of front face 17 of gate 15 has soldered, welded, or otherwise attached to it arm 20 having end 21 projecting from the side. This projecting end 21 is disposed within slot 104 of end 47 of actuating lever arm 78 which is pivoted on the side of chute 65 at screw or rivet 80. Free end 77 of arm 78 is flattened to provide better contact with solenoid 75, etc. during actuation of the latter. About half way between pivot 80 and slot 104 is grooved pin 79 attached to arm 78 and projecting from the side thereof. Above arm 78 is mounted pin 85 on the side of channel 43. Spring 81 is then mounted in such a manner that one end 84 is anchored against pivot 80. Its mid-section is then wound a few times around pin 85, while the other end is bent in the form of a V with the apex fitting around pin 79 when arm 78 is holding gate 15 in idle position. Actuation of solenoid 75 by switch 89 causes end 77 of arm 78 to be attracted downwardly which causes end 47 of arm 78 to be raised, which operation also raises gate 15 (via projecting arm 21) to produce the condition shown in Fig. 11. When solenoid 75 is inactivated by switch 89, upper section 82 of the V portion of spring 81 impresses a diagonal thrust, in the nature of an inclined plane, forcing gate 15 to return to idle position, and movement past this position is restrained by lower side 83 of the V portion of the spring which imposes a diagonal thrust in the direction opposite to that of side 82.

When the end 77 of lever arm 78 is raised by action of solenoid 76 or by other means, gate 15 is lowered by the action of the end 47 of arm 78 and the gate is returned to idle position by action of side 83 of the spring. The other side 82 of the spring then acts to restrain further movement of the gate.

Solenoid 76 is indicated in Fig. 7 as the motivating agent for the downward motion of the gate for coin collection.

Plug 71 (Fig. 6) is provided to plug in the electric energy for operating the unit. The switches actuated by levers 14 are indicated by numerals 48, 50, 51, 52, 53 and 54, while numerals 56, 58, 59, etc. show the necessary wiring required for completing the circuits discussed. Line 59, shown in Figure 6 and originating from switch 53, extends behind plug 71 to solenoid 76 (not shown). A baffle 60 is provided above chute 103 to avoid ejection of coins beyond hopper 61. Numeral 74 is employed to designate means for fastening the unit to stand 68 supported on base 69.

As in the earlier copending application, lever arm 1 is preferably topheavy since its center of gravity is somewhat above the pivoted portion, enough to cause the upper prongs 99 to fall back against the back wall of channel 43 when the lever arm is in idle position. Of course, it is possible to balance the arm at its center of gravity or else mount it so that its center of gravity is below the pivoted portion, provided some thrust means is employed to return the upper pronged portion of the lever arm back against the channel when the lever arm is in idle position. Such thrust means may be a light spring imposing tension on the lower portion of the lever arm, or a spring might be mounted to impose tension on wire arm 14 so as to return prongs 99 to the back of channel 43, and wire 11 may be welded or soldered to the back of lever arm 1, if desired. Such thrust means would be considered as equivalents to the gravity thrust means herein employed and found to be the simplest and least expensive.

The unit illustrated in Figures 6 and 8 is designed for demonstration purposes and is not necessarily to be used, with all of the appurtenances shown, in commercial vending machines, as would be obvious to one skilled in the art.

Although the upper section of lever arm 1 is shown in Figs. 1 and 2 as bifurcated, it is possible to employ a solid arm or one perforated or having more than two prongs. The bifurcated type is employed mainly for its weight saving features. The lever arms also may be mounted at any other portions than the sides, provided that the axis of mounting is parallel, substantially, to the plane of the channel back.

Baffle 42 on the back of front face 17 of gate 15 may be welded thereon or it may be made by pressing in the sides of the gate, or by welding projections in the sides of the gate adjacent the back of face 17, and these alternatives may be considered as equivalents of baffle 42 as shown.

Also, instead of V spring 81, it is possible to mount tensioned springs one above and one below arm 78, said springs being balanced so that arm 78 rests in the idle position when gate 15 is not actuated.

I claim:

1. In a weight actuated unit for actuating an extraneous device, wherein the weight is fed into the unit edgewise down a chute, into a substantially vertical channel, open at the front, in which at least one vertically disposed flat lever arm is pivotally mounted to the sides of said channel with the axis of mounting substantially parallel to the plane of the back wall of the channel far enough away from said back wall to allow sufficient room behind the pivoted portion of said lever arm to allow another weight to pass therethrough when said lever arm is actuated by the first weight, actuating means attached to said lever arm to actuate an extraneous device when the lever arm is actuated by said weight, a gate slidably mounted over the open front of said channel and capable of moving vertically thereover and having side walls and a weight retaining back wall with a centrally disposed opening through which projects the bottom portion of said lever arm when in idle position, said back wall of said gate also being provided with laterally disposed slots of such dimensions as to allow said weights to pass therethrough into the gate when the gate is moved vertically for a given distance, said slots being disposed above and below the lower edge of the weight when the latter is resting on the lever arm and the gate is in idle position, and said slots being spaced so that the weight passes through one of said slots when the gate is raised vertically, a retaining front face for said gate to act as a guide for said weights, and engaging means on said gate for engaging a motivating unit for effecting vertical movement of said gate, the improvement comprising an angularly disposed first baffle within the bottom section of the channel below the lever arm and serving to draw off said weights away from said channel, a downwardly disposed angular deflecting second baffle disposed at the bottom of the back of the front face of the gate in the proximity of the first baffle and disposed on said face in such manner that said second baffle is at least as high as the nearest edge of the first baffle when said gate is in idle and raised positions, and said second baffle is lower than the nearest edge of said first baffle when said gate is in lowered position, and the slots in the back of the gate are so spaced as to allow discharge of the weights therethrough when the gate is in raised and lowered positions, and retaining means in front of said gate attached to said channel to prevent separation of said gate from said channel.

2. A weight actuated unit according to claim 1 in the channel of which is mounted a series of vertically disposed, overlapping lever arms, and the gate is mounted so as to slide over the side edges of the channel.

3. A weight actuated unit according to claim 2 in which the engaging means on the gate is a rod projecting from the upper side edge thereof, an arm pivotally mounted on said channel having one end engaged to said rod and the other end associated with a vertical motivating agent for lifting and lowering said other end, and spring pulling means mounted above and below said pivotably mounted arm, between the rod and the pivot, for returning said gate in idle position when the vertical motivating force is removed.

4. A weight actuated unit according to claim 3 in which the spring pulling means is a sidewise disposed V-shaped spring mounted along the side of the channel with its apex in juxtaposition with the arm, fixed mounting means on said channel for fixedly mounting the upper end of the V, and a pin attached to the arm and projecting therefrom inside the apex of the V.

5. A weight actuated unit according to claim 1 in which the lever arm has a centrally disposed bottom portion of decreasing width in the downward direction and said bottom portion is bent forwardly at several sections below the suspension portion of said lever arm.

PETER G. CRISAFULLI.

No references cited.